Figure 1:
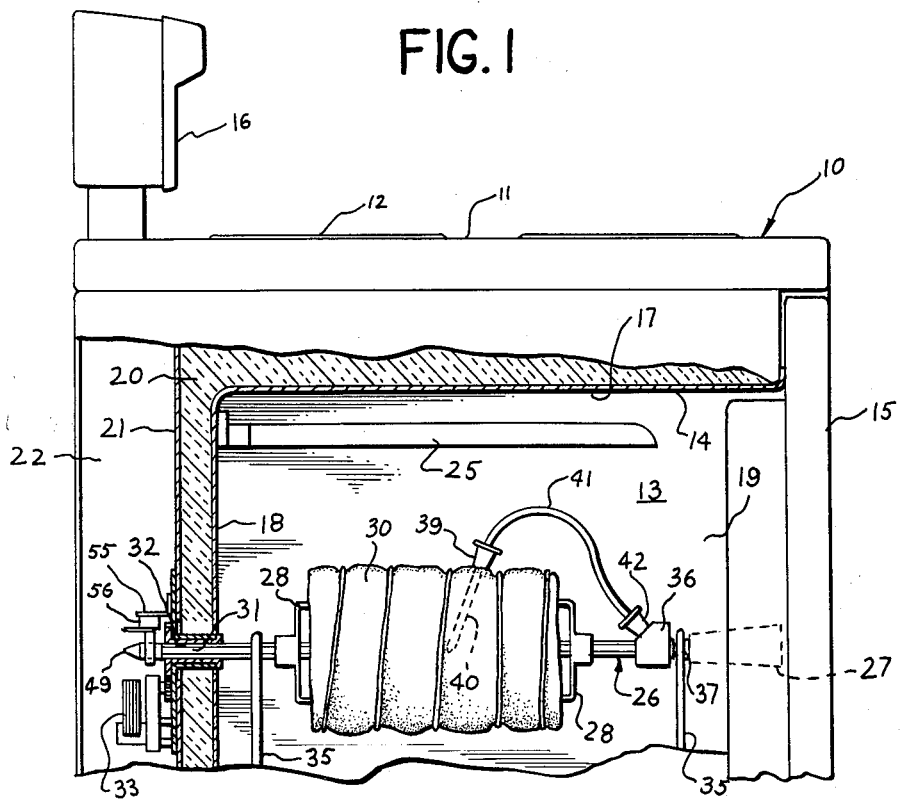

May 14, 1963 R. A. KINKLE 3,089,407
TEMPERATURE SENSOR FOR ROASTING OVEN
Filed Sept. 21, 1961

INVENTOR.
ROBERT A. KINKLE
BY Richard L. Caskin
HIS ATTORNEY

United States Patent Office 3,089,407
Patented May 14, 1963

3,089,407
TEMPERATURE SENSOR FOR ROASTING OVEN
Robert A. Kinkle, Louisville, Ky., assignor to General
Electric Company, a corporation of New York
Filed Sept. 21, 1961, Ser. No. 139,709
5 Claims. (Cl. 99—340)

The present invention relates to roasting ovens for domestic use and particularly to an oven having a novel rotisserie spit that is combined with a standard oven thermometer of the electric resistance type for detecting and remotely indicating the internal temperature of foods impaled on the spit.

Many different makes of electric and gas ranges are presently equipped with an electric resistance type of oven thermometer which when inserted in such meats as roasts, steaks, or poultry with give a remote indication of the degree of doneness of the meat during a roasting or broiling operation. Such thermometers and their associated components such as a temperature indicating meter, buzzer and a step-down transformer are connected by suitable circuitry which may either produce an audible signal to alert the housewife that the food is ready to be removed from the oven or the oven heating elements might be de-energized either with or without the signal.

Motor-driven rotisserie spits are also available in many different makes of domestic ovens, but a satisfactory electric type of oven thermometer with a remote temperature indicating meter has not been made commerically available for use with a rotisserie spit. The present invention is a solution which has proved both technically feasible and commercially practical because it utilizes the standard oven thermometer which is designed to have double usage either with food on the rotisserie spit or with other foods that remain stationary while being cooked in the oven.

The principal object of the present invention is to provide a roasting oven with a novel rotisserie spit which is capable or being combined with an electric type oven thermometer so that the internal temperature of the food being cooked on the spit may be detected and then indicated remotely.

A further object of the present invention is to provide a novel rotisserie spit which is capable of serving as a circuit conductor for use in the circuit of a plug-in type electric thermometer under conditions of use.

The present invention, in accordance with one form thereof, embodies a novel rotisserie spit that is adapted to be installed in a roasting oven. The spit is supported at its two ends, and one end includes an electric receptacle for receiving the attachment plug of a flexible cord of an electric thermometer. The spit, in addition to its usual function of holding and turning the food, also serves as a circuit conducting member. The end of the spit opposite the receptacle includes an electrical take-off means so that the circuit through the spit may be joined to a temperature indicating meter. Accordingly, it is possible to utilize the conventional plug-tin type electric thermometer during rotisserie cooking by plugging the thermometer into the receptacle of the spit.

My invention will be better understood from the following description taken in connection with the accompanying drawing and its scope will be pointed out in the appended claims.

Figure 2:
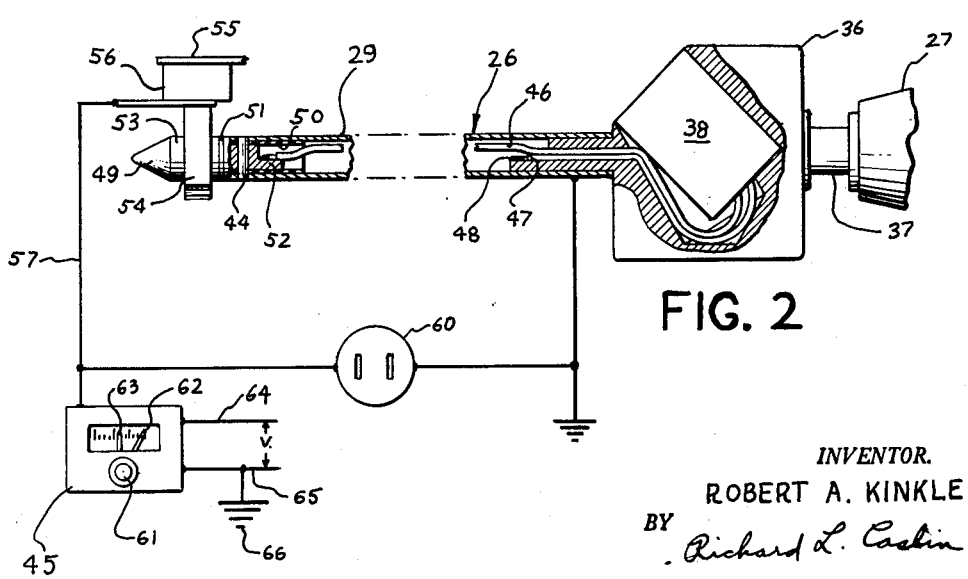

FIGURE 1 is a left side fragmentary elevational view of a free-standing range partly in cross-section showing the upper portion of the oven with a rotisserie assembly mounted therein; and FIGURE 2 is a schematic diagram of the rotisserie spit showing a simple low voltage circuit by which it is connected to a temperature indicating meter and in parallel with the circuit of an oven-liner mounted electrical receptacle of the type in use today for a thermometer in combination with food that remains stationary while it is being cooked in the oven.

Turning now to a consideration of the drawing and in particular to FIGURE 1, there is shown for illustrative purposes a free-standing electric range 10 having a body that includes mainly a top cooking surface 11 with a plurality of surface heating elements 12 and an oven cavity 13 formed by a box-like oven liner 14 and a front-opening drop door 15. A backsplasher 16 is arranged along the back edge of the cooking surface 11, and it contains a control panel (not shown) which may incorporate the various switches, meters, thermostats, lamps, clock and electric receptacles which are found most useful in a completely equipped domestic range.

The oven liner 14 has a top wall 17, a back wall 18, parallel side walls 19, and a bottom wall (not shown). This oven liner 14 is surrounded by batts of fiberglass or other suitable insulating material 20 for restricting the heat flow from the oven cavity 13. A back panel 21 confines the insulation 20 up against the back wall 18 of the oven liner and this back panel establishes a wiring chamber 22 that allows space in the back of the range body for receiving the wiring harness that connects the power supply cable to the various heating elements and controlling components of the range.

The oven is designed to include the standard heating elements; namely, the upper broil unit 25 adjacent the roof of the oven liner and the lower bake unit (not shown) that is adapted to be seated on the bottom wall of the oven liner. Both the bake and broil units are connected through the back wall 18 of the oven liner to the power circuit of the oven. Standard ovens also include shelf supporting inner embossments (not shown) or the like on the opposite side walls 19 of the oven liner. These embossments serve to support the various adjustable wire racks which are supplied with the oven to hold the containers of food at the proper distances from the heating elements during cooking.

The preceding information dealing with the details of the oven construction merely explains the environment in which the present invention is to be incorporated. Assembled in the oven cavity 13 is a rotisserie spit 26 that has an elongated hollow shaft 29 on which the heat is to be impaled. A removable outer handle 27 is provided on the spit and a pair of adjustable forks 28 are slidably mounted on the shaft thereof. Illustrated on the shaft 29 of the spit is a rolled roast of beef 30, and the adjustable forks 28 are forced together to penetrate the ends of the roast and hold the meat in a fixed position while the spit is turning. Both ends of the spit are each supported by a wire standard 35 which is formed as part of a rack-like frame (not shown) that is of substantially the same overall size as one of the wire racks of the oven so that it can be supported from the rack supporting embossments on the side walls 19 of the oven liner. The inner end 31 of the spit opposite the handle 27 extends completely through a socket 32 in the back wall 18. The socket is formed as part of a drive motor and gear assembly 33 that is mounted behind the back panel 21 of the oven. This socket member 32 extends through both the back panel 21 and the back wall 18 of the oven liner so that its innermost end is located within the oven cavity to facilitate the ease of inserting the spit therein.

After the meat has been placed on the spit and the spit assembled in the oven as shown in FIGURE 1 the handle 27 is removed because it would interfere with the closing of the door. During the use of the rotisserie only the broil unit 25 is energized and the door 15 should be opened slightly to the broil position. A broiler pan (not shown) is placed under the meat to catch the grease drippings that would otherwise accumulate on the bottom of the oven liner and create a soiled condition.

As mentioned previously, up until the present time the housewife has been forced to take the chance of inserting the simple mercury bulb type of oven thermometer into the meat and being careful to position the thermometer so that when the spit rotates the thermometer will not strike the broil unit 25 and be destroyed by the impact. This has the added disadvantage that it is necessary to stop the spit from turning and open the oven door in order to position oneself where the scale of the thermometer may be read. These inconveniences are magnified by the unconscious realization that electric type oven thermometers have been available for many years for normal oven roasting operations, and these thermometers plug into a suitable receptacle in the side wall of the oven liner so that the internal temperature of the food being cooked in the oven may be read off the temperature indicating meter located in the control panel of the range. Moreover, these temperature indicating meters are usually provided with a manual setting so that the desired food temperature can be preset and when it is reached either an audible or visual signal will be actuated or in some cases the oven heating elements are de-energized so that the oven may cool down automatically even though the housewife were absent from the kitchen.

The present invention incorporates a novel rotisserie spit 26 which is best illustrated in FIGURE 2 as comprising an elongated hollow metal shaft 29, an enlarged bulbous portion 36 and a removable heat insulating handle 27 of high temperature plastic material or the like. Located between the handle portion 27 and the bulbous portion 36 is a journal 37 which rests in a semi-circular seat formed at the top of the wire standard or form 35 of the rack-like frame that supports the rotisserie spit 26.

Formed within the bulbous portion 36 is an electric receptacle 38.

Turning back to FIGURE 1 for the moment, there is shown an electric oven thermometer 39 having a thermometer probe 40 extending into the roast 30 so that the tip of the probe 40 will rest in the center of the thickest meaty part of the roast. The probe 40 is a skewer-like member at one end of a chromium covered flexible electric cable 41 that has a two-pronged attachment plug 42 at the other end. A representative type of resistance thereometer which would be suitable for this purpose is illustrated in the Boddy Patent 2,925,572. Generally the probe 40 of the thermometer incorporates a thermistor located in the tip thereof. A thermistor is a device which has a negative resistance-temperature coefficient. This means that as its temperature rises its electrical resistance decreases. One example of this change of resistance as the temperature changes is a thermistor that has a resistance range from 400 ohms at 70° F. to 38 ohms at 200° F. One lead of the thermistor is connected to a conductor in the flexible cable 41 while another lead is grounded to the probe handle and also passes through the cable to the attachment plug. Since this electric thermometer 39 is a standard commercially available product and its exact details form no part of the present invention, it has not been described to such an extent that would enable one skilled in the art to reproduce it. However, if further information about it is desired, reference may be had to the above-cited Boddy patent.

It is necessary that the rotisserie spit 26 incorporate current conductors to complete the circuit between the oven thermometer 39 and a temperature indicating meter 45 shown diagrammatically in FIGURE 2, it being understood that such a meter would be installed in the control panel of the backsplasher 69 or other control point of the oven. The shaft 29 of the spit is generally hollow for receiving two insulated conductors or leads 46 and 47 that are both joined at one end to the electric receptacle 38. Lead 47 is grounded to the shaft 29 as at 48, while the lead 46 is electrically connected to a bullet-shaped tip 49 of the shaft which is inserted into the end of the shaft 29 but is electrically insulated therefrom and held in place by an insulating pin 44 of nylon or the like material. The innermost end of the tip 49 includes a terminal portion 52 to which the lead 46 is electrically connected and is of reduced cross-section for receiving an insulating sleeve 50 thereover. An insulating gasket 51 is sandwiched between the end face of the shaft 29 and a shoulder of the tip 49.

The tip 49 of the spit has an outer cylindrical surface or ring portion 53 which cooperates with a spring biased collector or brush member 54 and constitutes an electrical take-off means from the rotating spit. A bracket member 55 is fastened to the back panel 21 of the range for supporting the brush member 54 from an insulating block 56. A lead 57 is connected between the brush 54 and the temperature indicating meter 45. The other side of the line is grounded to the metal shaft 29 of the spit and through the socket 32 to the grounded range body 10 to complete the circuit between the temperature sensing thermistor in the probe 40 of the oven thermostat 39 and the temperature indicating meter 45 by way of the rotating spit 26. Low voltage power on the order of 6 v. or 12 v. is supplied from a step-down transformer to the meter 61 by a pair of line wires 64 and 65. Line 65 is shown as grounded as at 66. Connected in parallel across the leads of the electrical receptacle 38 of the spit and to the meter 45 is a second receptacle 60 which is a standard oven thermometer receptacle that would be mounted in one of the side walls of the oven liner and would be used with the oven thermostat 39 when the food to be cooked in the oven does not revolve. This empasizes one of the important advantages of the present invention; namely, the fact that a single oven thermometer 39 can be used to detect the internal temperature of food being roasted in a pan within the oven or while the food is being roasted on the rotisserie spit while it revolves within the oven cavity.

The temperature indicating meter 45 is usually provided with an adjusting dial 61 that controls the position of a movable pointer 62 so that the desired temperature of the food to be cooked may be set by this pointer. A second pointer 63 registers the actual internal temperature of the food and when these two pointers coincide an auxiliary circuit (not shown) will be energized to sound an audible signal, activate a visual signal, or alternatively it might de-energize or cycle the heating elements of the oven. Just exactly what control is activated when the temperature reachts the desired point is not of great importance to the present invention since each manufacturer has different theories as to what measures are necessary in order to bring the completion of the cooking operation to the attention of the housewife and prevent overcooking.

Having described above a preferred embodiment of the present invention it will readily be apparent to those skilled in this art that instead of relying upon the metal shaft of the spit to ground the circuit to the range body through the socket 32, the electrical take-off means in the tip 49 of the spit could include a pair of insulated rings connected by separate conductors to the receptacle 38. This would require a pair of brushes such as brush 54 for completing the circuit between the rings and the meter 45. Also, the brush 54 or brushes could be built into the motor assembly 33 as an integral unit.

Modifications of this invention will occur to those skilled in this art and it is to be understood, therefore, that this invention is not limited to the particular embodiment disclosed but that it is intended to cover all modifications which are within the true spirit and scope of this invention as claimed.

What I claim as new and desire to secure by Letters Patent of the United States is:

1. A roasting oven having oven walls defining an oven cavity, support means within the cavity, a rotisserie spit positioned on the support means for revolving thereon, motor means on one wall of the oven, coupling means between the motor means and the spit so that the motor means will turn the spit, a plug-in type electric resistance oven thermometer adapted to be inserted into meat held on the spit, the thermometer including an electric cable with an attachment plug at one end, the spit including an electric receptacle at one end removably receiving the attachment plug of the thermometer cable, the spit including current conducting elements connected to the receptacle. a temperature indicating meter combined with the oven but at a distance therefrom, an electrical take-off means at the opposite end of the spit connecting the electrical conductors of the spit in a circuit with the meter so that the internal temperature of the meat may be registered by the meter as the rotisserie spit revolves in the oven.

2. A roasting oven as recited in claim 1 with the addition of a second electric receptacle in one wall of the oven, this second receptacle being connected to the said meter in a parallel circuit with the first receptacle carried by the spit so that the plug on the thermometer cable may be connected alternately into either receptacle for indicating the internal temperature of the foods in the oven depending on whether the food is to remain stationary or the food is revolved on the spit.

3. A roasting oven comprising walls defining an oven cavity, an oven thermometer located within the oven for indicating the temperature of food being cooked therein, an electric receptacle in one wall of the oven, the thermometer including a temperature sensing probe and an electric cable removably plugged into the receptacle, a temperature indicating meter combined with the oven and electrically connected in a circuit with the thermometer for registering the internal temperature of the food being cooked; the invention comprising a rotisserie spit, support means within the oven for holding the spit, a drive motor mounted on one wall of the oven, one end of the spit being connected to said motor so that the spit revolves on the support means, an electric receptacle mounted on the opposite end of the spit, and electric take-off means at the motor-connected end of the spit, the spit including electric current conducting means joining the receptacle of the spit to the said take-off means, and circuit leads joining the take-off means of the spit and the temperature indicating meter, the circuit of the receptacle of the spit being in parallel with the circuit for the first-mentioned receptacle, so that the oven thermometer may be used to determine the internal temperature of foods being cooked on the rotisserie spit or alternatively foods that do not revolve while they are being cooked in the oven.

4. A roasting oven comprising walls defining an oven cavity, a rotisserie spit supported within the oven for rotary movement therein, one end of the spit extending through one wall of the oven, a drive motor supported behind said wall and engaging said spit for driving the same, the spit having an elongated hollow metal shaft that is adapted to be supported at its opposite ends, an electric receptacle carried by the spit at one end that is opposite the drive motor but inside the point of support thereof, and electrical take-off means provided at the end of the spit adjacent the drive motor, the spit including a portion of an electric circuit that joins the electric receptacle to the take-off means and separately joins the electric receptacle to the shaft of the spit, the oven including a remotely located temperature indicating meter which is electrically connected to the spit, and an oven thermometer separate from the spit and being adapted to be inserted into meat impaled on the spit, said thermometer having an electrical connection with the said receptacle carried by the spit.

5. A roasting oven comprising walls defining an oven cavity, a rotisserie spit supported at points at its two ends within the cavity for rotary movement therein, one end of the spit extending through one wall of the oven, a drive motor supported behind said wall and engaging said spit for driving the same, an electric receptacle fastened to the spit intermediate the two support points, and electrical take-off means provided at the end of the spit that extends outside the oven, and an electric resistance thermometer separate from the spit and having a probe that is insertable into meat impaled on the spit, said thermometer being removably connected to the said receptacle, and a temperature indicating meter remote from the oven and operating on a low voltage source of current, said meter being electrically connected to the said take-off means for completing a circuit between the meter, the spit, and the thermometer.

References Cited in the file of this patent

UNITED STATES PATENTS

| | | |
|---|---|---|
| 2,005,421 | High | June 18, 1935 |
| 2,558,294 | Finizie | June 26, 1951 |
| 2,657,580 | Schroeder | Nov. 3, 1953 |
| 2,787,948 | Mathis | Apr. 9, 1957 |